US012638724B2

(12) United States Patent
Gim et al.

(10) Patent No.: US 12,638,724 B2

(45) Date of Patent: May 26, 2026

(54) LIGHT MODULATING DEVICE

(71) Applicant: LG Chem, Ltd., Seoul (KR)

(72) Inventors: Min Jun Gim, Daejeon (KR); Dong Hyun Oh, Daejeon (KR); Jung Sun You, Daejeon (KR); Jin Hong Kim, Daejeon (KR); Jung Woon Kim, Daejeon (KR); Han Min Seo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 75 days.

(21) Appl. No.: 18/017,692

(22) PCT Filed: Jul. 27, 2021

(86) PCT No.: PCT/KR2021/009692

§ 371 (c)(1),
(2) Date: Jan. 24, 2023

(87) PCT Pub. No.: WO2022/025583

PCT Pub. Date: Feb. 3, 2022

(65) Prior Publication Data

US 2023/0280616 A1 Sep. 7, 2023

(30) Foreign Application Priority Data

Jul. 28, 2020 (KR) ........................ 10-2020-0093729

(51) Int. Cl.
*G02F 1/1339* (2006.01)
*B32B 7/12* (2006.01)
(Continued)

(52) U.S. Cl.
CPC .............. *G02F 1/1339* (2013.01); *B32B 7/12* (2013.01); *B32B 17/10* (2013.01); *B32B 27/306* (2013.01);
(Continued)

(58) Field of Classification Search
CPC ............ G02F 1/1339; G02F 1/133531; G02F 1/133742; G02F 1/133726; G02F 1/1396
See application file for complete search history.

(56) References Cited

U.S. PATENT DOCUMENTS 6,396,553 B1 5/2002 Maruyama
7,623,209 B2 * 11/2009 Lin ........................ G02F 1/141
349/131

(Continued)

FOREIGN PATENT DOCUMENTS

CN 107430301 A 12/2017
CN 110612474 A 12/2019

(Continued)

OTHER PUBLICATIONS

International Search Report for Application No. PCT/KR2021/009692 mailed Nov. 15, 2021, pp. 1-3.

(Continued)

*Primary Examiner* — David Y Chung

(74) *Attorney, Agent, or Firm* — Lerner David LLP

(57) ABSTRACT

A light modulating device is disclosed herein. In some embodiments, a light modulating device includes a light modulation film layer, wherein the light modulation film layer includes a first substrate, a second substrate, and a liquid crystal layer, wherein the liquid crystal layer is disposed between the first and second substrates, wherein the liquid crystal layer and is capable of implementing twisted orientation, and wherein a K value is in a range of 0.15 to 0.4. The light modulation device can stably maintain designed optical properties even after an encapsulation process in which a pressure is applied, such as an autoclave process. The light modulating device can also stably main- (Continued)

tain the orientation state of the light modulation layer while effectively securing adhesive force between upper and lower substrates.

14 Claims, 2 Drawing Sheets

(51) Int. Cl.

| | |
|---|---|
| ***B32B 17/10*** | (2006.01) |
| ***B32B 27/30*** | (2006.01) |
| ***B32B 37/10*** | (2006.01) |
| ***B60J 3/04*** | (2006.01) |
| ***C09J 5/06*** | (2006.01) |
| ***C09J 7/38*** | (2018.01) |
| ***E06B 9/24*** | (2006.01) |
| ***G02F 1/1335*** | (2006.01) |
| ***G02F 1/1337*** | (2006.01) |
| ***G02F 1/139*** | (2006.01) |

(52) U.S. Cl.

CPC ................. *B32B 37/10* (2013.01); *B60J 3/04* (2013.01); *C09J 5/06* (2013.01); *C09J 7/38* (2018.01); *G02F 1/133531* (2021.01); *G02F 1/133726* (2021.01); *G02F 1/133742* (2021.01); *G02F 1/1396* (2013.01); *B32B 2307/42* (2013.01); *B32B 2307/7376* (2023.05); *B32B 2329/04* (2013.01); *B32B 2605/006* (2013.01); *C09J 2203/318* (2013.01); *C09J 2301/302* (2020.08); *C09J 2483/00* (2013.01); *E06B 9/24* (2013.01); *E06B 2009/2464* (2013.01); *G02F 2202/06* (2013.01); *G02F 2202/28* (2013.01)

(56) References Cited

U.S. PATENT DOCUMENTS

| | | | | |
|---|---|---|---|---|
| 2002/0080312 | A1 | 6/2002 | Yamaguchi et al. | |
| 2004/0207594 | A1 | 10/2004 | Kubo | |
| 2008/0284948 | A1* | 11/2008 | Koishi | G02F 1/13363 359/489.07 |
| 2009/0153756 | A1* | 6/2009 | Roberts | G02F 1/13718 349/190 |
| 2009/0185100 | A1* | 7/2009 | Matsuhira | G02B 6/005 361/679.01 |
| 2010/0220266 | A1* | 9/2010 | Kashima | G02B 1/105 349/96 |
| 2011/0134375 | A1 | 6/2011 | Takigawa et al. | |
| 2013/0148071 | A1 | 6/2013 | Chen et al. | |
| 2016/0154264 | A1 | 6/2016 | Kawata | |
| 2016/0231620 | A1* | 8/2016 | Jeon | G02F 1/133536 |
| 2018/0074377 | A1* | 3/2018 | You | C08J 5/12 |
| 2018/0373084 | A1 | 12/2018 | Lim et al. | |
| 2019/0162991 | A1 | 5/2019 | Hagiwara | |
| 2019/0235301 | A1 | 8/2019 | Park et al. | |
| 2019/0276719 | A1* | 9/2019 | Lee | C09J 163/10 |
| 2019/0384094 | A1 | 12/2019 | Lee et al. | |
| 2020/0002611 | A1* | 1/2020 | Ohishi | G02F 1/133502 |
| 2020/0057335 | A1 | 2/2020 | Lee et al. | |
| 2023/0305338 | A1 | 9/2023 | Gim et al. | |

FOREIGN PATENT DOCUMENTS

| | | | |
|---|---|---|---|
| CN | 115997161 | A | 4/2023 |
| EP | 3617782 | A1 | 3/2020 |
| EP | 4187314 | A1 | 5/2023 |
| JP | H01186911 | A | 7/1989 |
| JP | 2002040432 | A | 2/2002 |
| JP | 2008046662 | A | 2/2008 |
| JP | 2010039281 | A | 2/2010 |
| JP | 2011164273 | A | 8/2011 |
| JP | 5093779 | B2 | 12/2012 |
| JP | 2013148632 | A | 8/2013 |
| JP | 2018507443 | A | 3/2018 |
| JP | 2018088010 | A | 6/2018 |
| JP | 2020067498 | A | 4/2020 |
| JP | 2020517987 | A | 6/2020 |
| JP | 2020518017 | A | 6/2020 |
| KR | 100303715 | B1 | 11/2001 |
| KR | 100624586 | B1 | 9/2006 |
| KR | 20140077858 | A | 6/2014 |
| KR | 20150008013 | A | 1/2015 |
| KR | 20160117343 | A | 10/2016 |
| KR | 20160146566 | A | 12/2016 |
| KR | 20180119517 | A | 11/2018 |
| KR | 20180119519 | A | 11/2018 |
| KR | 20180121425 | A | 11/2018 |
| KR | 20190008183 | A | 1/2019 |
| KR | 102079143 | B1 | 2/2020 |
| KR | 20200044473 | A | 4/2020 |
| WO | 2018038260 | A1 | 3/2018 |

OTHER PUBLICATIONS

Search Report dated Aug. 22, 2022 from the Office Action for Chinese Application No. 110127522 issued Aug. 23, 2022, 2 pages. [See p. 1, categorizing the cited references].

Extended European Search Report including Written Opinion for Application No. 21849170.2 dated Jan. 2, 2024, pp. 1-11.

* cited by examiner

[Figure 1]
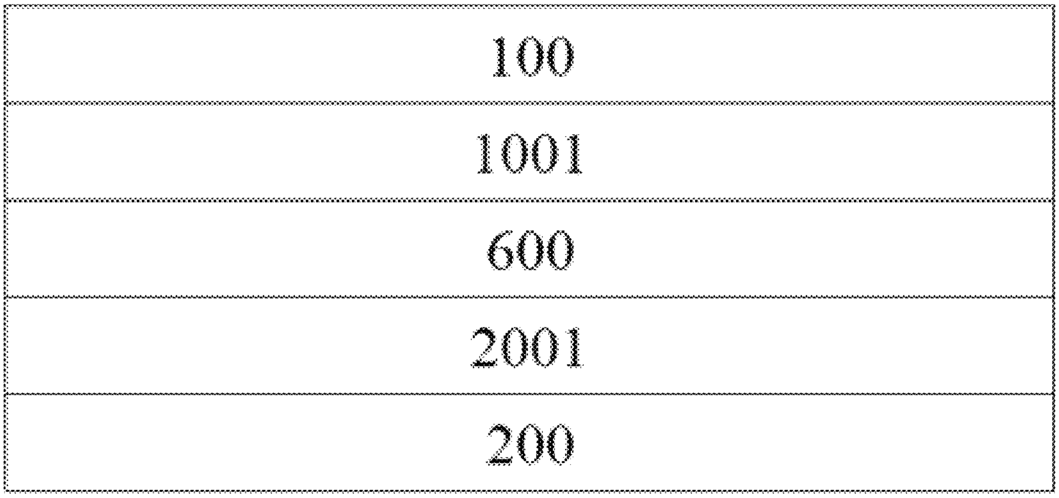
[Figure 2]
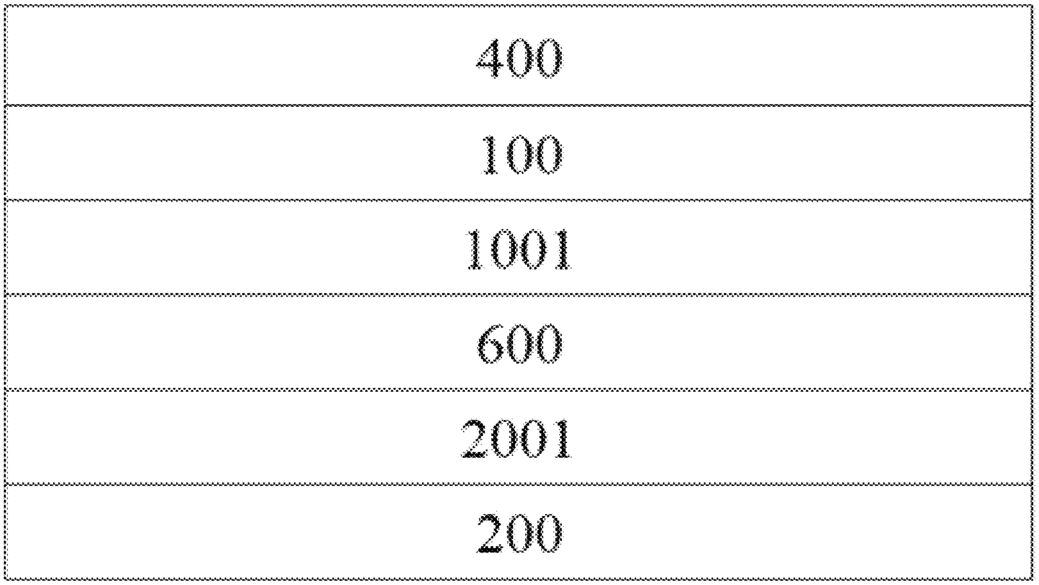
| 100 |
|---|
| 1001 |
| 600 |
| 2001 |
| 200 |
| 400 |
|---|
| 100 |
| 1001 |
| 600 |
| 2001 |
| 200 |

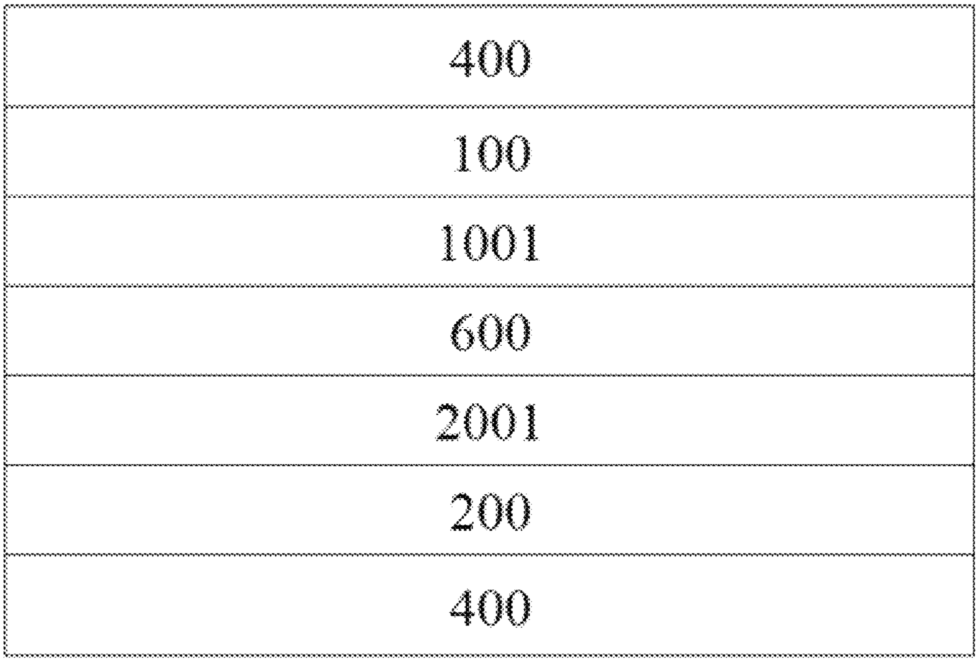
[Figure 3]
| |
|---|
| 400 |
| 100 |
| 1001 |
| 600 |
| 2001 |
| 200 |
| 400 |
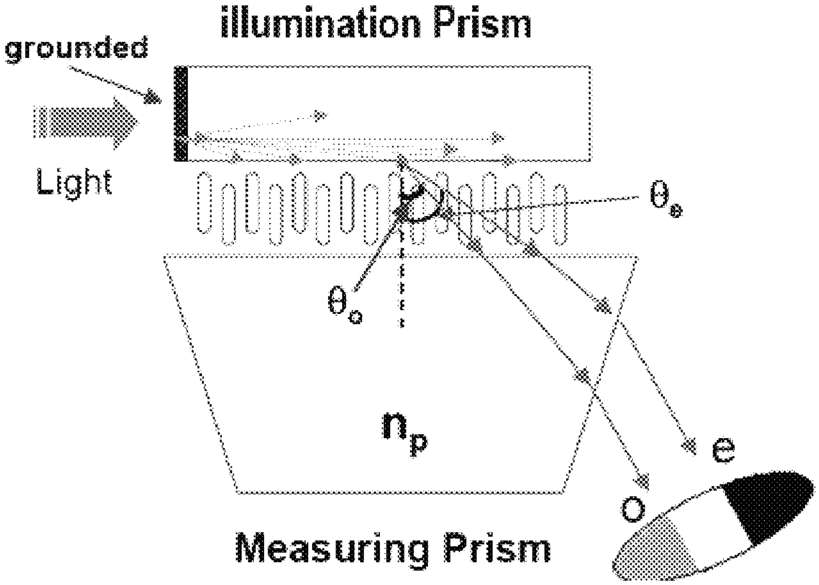
[Figure 4]
illumination Prism
grounded
Light
$\theta_e$
$\theta_o$
$n_p$
e
o
Measuring Prism

LIGHT MODULATING DEVICE

CROSS-REFERENCE TO RELATED APPLICATIONS

This application is a national phase entry under 35 U.S.C. § 371 of International Application No. PCT/KR2021/009692, filed on Jul. 27, 2021, which claims priority based on Korean Patent Application No. 10-2020-0093729, filed on Jul. 28, 2020, the disclosures of which are incorporated by reference herein.

TECHNICAL FIELD

The present disclosure relates to a light modulating device.

BACKGROUND ART

A light modulating device, in which a light modulation layer comprising a liquid crystal compound and the like is positioned between two substrates, is used for various applications.

In order for the light modulating device to exhibit performance suitable for the intended use, it is important to control the orientation state of the liquid crystal compound between the substrates according to the purpose. In the case where the light modulation layer is a liquid crystal layer, for controlling the orientation (especially initial orientation) of the liquid crystal compound, a device to which the liquid crystal compound is applied forms alignment films on both of the two substrate surfaces facing each other.

A technique for configuring an optical device by encapsulating a light modulating device with an encapsulating agent or the like is known, and a pressure is applied to the optical device in the encapsulation process (for example, Patent Document 1).

As such, mostly, in the encapsulation processes, the pressure is applied to the light modulating device. Therefore, there is a problem that the optical characteristics of the light modulating device are changed to be different from the designed characteristics by the applied pressure or the positions of the substrates disposed opposite to each other are misaligned by the pressure, thereby also generating optical defects.

PRIOR ART DOCUMENTS

Patent Documents (Patent Document 1) Korean Laid-Open Patent Publication No. 2018-0119517

BRIEF DESCRIPTION OF DRAWINGS

FIGS. 1 to 3 are schematic diagrams of an exemplary light modulating device of the present disclosure.

FIG. 4 is a view for explaining a process of obtaining a refractive index anisotropy of a light modulation layer.

DISCLOSURE

Technical Problem

The present disclosure provides a light modulating device, an optical device or a manufacturing method thereof. The present disclosure is intended to provide a light modulating device that can stably maintain designed optical properties even after an encapsulation process in which a pressure is applied, such as an autoclave process, an optical device or a manufacturing method thereof. The present disclosure is also intended to provide a light modulating device, which can also stably maintain the orientation state of a light modulation layer while effectively securing adhesive force between upper and lower substrates, an optical device comprising the same or a manufacturing method thereof.

Technical Solution

In this specification, the term 'vertical, parallel, orthogonal, or horizontal' defining an angle and an angular numerical value mean 'substantially vertical, parallel, orthogonal, or horizontal' and the substantially numerical value of the angle within a range without impairing the desired effect. The vertical, parallel, orthogonal, or horizontal and the numerical range include errors such as manufacturing errors or deviations (variations). For example, the above cases may each include an error within about ±10 degrees, an error within about ±9 degrees, an error within about ±8 degrees, an error within about ±7 degrees, an error within about ±6 degrees, an error within about ±5 degrees, an error within about ±4 degrees, an error within about ±3 degrees, an error within about ±2 degrees, an error within about ±1 degree, an error within about ±0.8 degrees, an error within about ±0.6 degrees or an error within about ±0.4 degrees.

Among physical properties mentioned in this specification, when the measured temperature affects relevant physical properties, the physical properties are physical properties measured at room temperature, unless otherwise specified. The term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

The phase difference, refractive index and refractive index anisotropy mentioned in this specification means the phase difference, refractive index and refractive index anisotropy for light with a wavelength of about 550 nm, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, the angle measured in the clockwise direction may be represented as a positive number, and the angle measured in the counterclockwise direction may be represented as a negative number.

The present disclosure relates to a light modulating device. The term light modulating device may mean a device capable of switching between at least two or more different light states. Here, the different light states may mean states that at least transmittance, reflectance, color and/or haze are different.

An example of the state that the light modulating device can implement includes a transparent, black, high reflection, low-reflection and/or color mode state indicating a specific color and the like, but is not limited thereto.

In one example, the light modulating device may be a device capable of switching between at least the transparent and black mode states.

The transmittance of the light modulating device in the transparent mode may be at least 10% or more, 15% or more, 20% or more, 25% or more, 30% or more, 35% or more, 40% or more, 45% or more, 50% or more, 55% or more, 60% or more, 65% or more, 70% or more, 75% or more, or 80% or more. In another example, the transmittance in the transparent mode may also be about 100% or less, 95% or less, 90% or less, or 85% or less or so. However, the upper limit is not particularly limited because the higher the transmittance in the transparent mode, the more advantageous it is.

The transmittance of the light modulating device in the black mode state may be 60% or less, 55% or less, 50% or less, 45% or less, 40% or less, 35% or less, 30% or less, 25% or less, 20% or less, 15% or less, 10% or less, or 5% or less. In another example, the transmittance in the black mode may also be about 0% or more, 5% or more, 10% or more, 15% or more, 20% or more, or 25% or more or so. However, the lower limit of the transmittance in the black mode state is not particularly limited because the lower the transmittance in the black mode, the more advantageous it is.

The transmittance may be, for example, linear light transmittance. The linear light transmittance is a percentage of the ratio of the light transmitted in the same direction as the incident direction to the light incident on the device. For example, if the device is in the form of a film or sheet, the percentage of the light transmitted through the device in the direction parallel to the normal direction among the light incident in a direction parallel to the normal direction of the film or sheet surface may be defined as the transmittance.

The transmittance may be each transmittance for any one wavelength in the visible light region, for example, any one wavelength in a range of about 400 to 700 nm or about 380 to 780 nm, or transmittance for the entire visible light region, maximum or minimum transmittance among the transmittance for the entire visible light region, or an average value of the transmittance in the visible region.

In one example, the light modulating device of the present disclosure may be designed to switch between any one state selected from the transparent mode and black mode states, and the other state. If necessary, other third different states or higher states rather than the above states may also be implemented.

The switching of the light modulating device may be controlled depending on whether or not an external signal, for example, a voltage signal is applied. For example, in a state of not applying an external signal such as a voltage, the light modulating device may maintain any one of the above-described states, and then may be switched to another state when a voltage is applied. The state of the mode may be changed or the third different mode state may also be implemented, by changing the intensity, frequency and/or shape of the applied voltage.

The light modulating device of the present disclosure may comprise, as a basic unit, a light modulation film layer having two substrates disposed opposite to each other and a light modulation layer positioned between the substrates. FIG. 1 is a diagram showing one example of the light modulation film layer. As shown in the drawing, the light modulation film layer comprises a first substrate (100) and a second substrate (200) which are oppositely disposed. The first and second substrates may have a first surface and a second surface. Here, the first surface may be one major surface of the substrate, and the second surface may mean a major surface opposite thereto.

As shown in the drawing, a functional layer may be formed on one surface (e.g., the first surface) of the first substrate (100), and a liquid crystal alignment film (2001) may be formed on one surface (e.g., the first surface) of the second substrate (200). Here, the functional layer may also be a liquid crystal alignment film, and in another example, it may be an adhesive layer or a pressure-sensitive adhesive layer to be described below. A light modulation layer (600) is positioned between the oppositely disposed first substrate (100) and second substrate (200). When the light modulation layer is a liquid crystal layer, a liquid crystal alignment film is usually formed on both surfaces of the first and second substrates (100, 200), but a pressure-sensitive adhesive layer or adhesive layer is formed on the first substrate (100) instead of the liquid crystal alignment film, and a liquid crystal alignment film is formed only on the second substrate (200), whereby the orientation state of the liquid crystal compound, which is very useful in a specific application (e.g., smart window or eyewear), can also be obtained. In this case, a liquid crystal alignment film may not be formed on the first substrate. In addition, although not shown in the drawing, in any one of the first and second substrates of the light modulation film layer, a spacer for maintaining an interval (cell gap) between the first and second substrates is present, but when the functional layer on the first substrate (100) is the pressure-sensitive adhesive layer or adhesive layer (1001), the pressure-sensitive adhesive layer or adhesive layer (1001) is attached to the spacer, thereby being capable of greatly improving lamination force between the first and second substrates.

As the substrate, a known substrate material may be used without particular limitation. For example, an inorganic substrate such as a glass substrate, a crystalline or amorphous silicon substrate or a quartz substrate, or a plastic substrate may be used as the substrate. As the plastic substrate, a TAC (triacetyl cellulose) substrate; a COP (cycloolefin copolymer) substrate such as a norbornene derivative substrate; a PMMA (poly(methyl methacrylate)) substrate; a PC (polycarbonate) substrate; a PE (polyethylene) substrate; a PP (polypropylene) substrate; a PVA (polyvinyl alcohol) substrate; a DAC (diacetyl cellulose) substrate; a Pac (polyacrylate) substrate; a PES (poly ether sulfone) substrate; a PEEK (polyetheretherketon) substrate; a PPS (polyphenylsulfone), a PEI (polyetherimide) substrate; a PEN (polyethylenenaphthatlate) substrate; a polyester substrate such as a PET (polyethyleneterephtalate) substrate; a PI (polyimide) substrate; a PSF (polysulfone) substrate; a PAR (polyarylate) substrate or a substrate comprising an amorphous fluororesin or the like may be used, without being limited thereto. The thickness of such a substrate is not particularly limited, which may be selected within an appropriate range.

In one example, as the substrate, an optically anisotropic film may also be applied. A film having such optical anisotropy is also usually anisotropic in mechanical properties, and it is possible to provide a light modulating device having superior durability and the like by utilizing such anisotropy.

In one example, the anisotropic film may have an in-plane phase difference of about 500 nm or more. The in-plane phase difference is a value for light with a wavelength of 550 nm, and is a physical quantity defined by the following Equation 2. In another example, the in-plane phase difference of the retardation film may be 600 nm or more, 700 nm or more, 800 nm or more, 900 nm or more, 1000 nm or more, 1100 nm or more, 1200 nm or more, 1300 nm or more, 1400 nm or more, 1500 nm or more, 2000 nm or more, 2500 nm or more, 3000 nm or more, 3500 nm or more, 4000 nm or more, 4500 nm or more, 5000 nm or more, 5500 nm or more, 6000 nm or more, 6500 nm or more, 7000 nm or more, 7500 nm or more, 8000 nm or more, 8500 nm or more, 9000 nm or more, or 9500 nm or more, or may also be 100000 nm or less, 90000 nm or less, 80000 nm or less, 70000 nm or less, 60000 nm or less, 50000 nm or less, 40000 nm or less, 30000 nm or less, 20000 nm or less, 15000 nm or less, 14000 nm or less, 13000 nm or less, 12000 nm or less, 10000 nm or less, 9500 nm or less, 9000 nm or less, 8500 nm or less, 8000 nm or less, 7500 nm or less, 7000 nm or less, 6500 nm or less, 6000 nm or less, 5500 nm or less, 5000 nm or less, or 4500 nm or less or so.

In the present disclosure, a specific kind of the film applicable to the substrate is not particularly limited as long as it exhibits an in-plane phase difference in the above-mentioned range. For example, an anisotropic polymer film to which optical anisotropy is imparted by stretching may be applied. The polymer film may be exemplified by, for example, a polyolefin film such as a polyethylene film or a polypropylene film, a cycloolefin polymer (COP) film such as a polynorbornene film, a polyvinyl chloride film, a polyacrylonitrile film, a polysulfone film, a polyacrylate film, a PVA (poly(vinyl alcohol)) film or a cellulose ester-based polymer film such as a TAC (triacetyl cellulose) film, a polyester film or a polycarbonate film, or a copolymer film of two or more monomers among monomers forming the polymer, and the like.

In one example, as the film, a polyester film such as a PET (poly(ethylene terephthalate)) film may be applied. That is, a film exhibiting an in-plane phase difference in the above-described range is known in the industry, and in the case of a polymer film, such a film exhibits asymmetry even in mechanical properties by stretching or the like in the manufacturing process as well as optically large anisotropy. A representative example of such a retardation film known in the industry is a stretched polyester film such as a stretched PET (poly(ethylene terephthalate)) film.

Therefore, in one example, a polyester film such as a PET film may be applied as the film, but the type of film applicable as a substrate in the present disclosure is not limited thereto.

In addition, the in-plane phase difference is a physical quantity according to Equation 2 below.

$$Rin=d\times(nx-ny) \quad \text{[Equation 2]}$$

In Equation 2, Rin is the in-plane phase difference, nx is the refractive index of the film in the slow axis direction, ny is the refractive index of the film in the fast axis direction, and d is the thickness of the film. Here, the meanings of the slow axis and the fast axis are known in the industry.

Also, when the anisotropic film is simultaneously applied to the first and second substrates, the substrates may be disposed such that their slow axes are parallel or perpendicular to each other.

The light modulation layer present between the substrates is a functional layer capable of changing light transmittance, reflectivity, haze and/or color, etc., alone or in conjunction with other components, depending on whether or not an external signal is applied. Such a light modulation layer may be referred to as an active light modulation layer herein.

In this specification, the external signal may mean an external factor, for example, an electric signal such as a voltage, which may affect the behavior of a light modulation material (for example, a liquid crystal compound) included in the light modulation layer (for example, liquid crystal layer). Therefore, a state without any external signal may mean a state where no electrical signal is applied from the outside.

In the present disclosure, the type of the light modulation layer is not particularly limited as long as it has the above-described functions, and a known light modulation layer can be applied. The light modulation layer may be, for example, a liquid crystal layer, an electrochromic material layer, a photochromic material layer, an electrophoretic material layer, or a dispersed particle orientation layer.

In one example, the liquid crystal layer may be applied as the light modulation layer. The liquid crystal layer is a layer containing a liquid crystal compound. In this specification, the range of the term liquid crystal layer includes all layers containing a liquid crystal compound, and for example, as described below, a so-called guest host layer comprising a liquid crystal compound (liquid crystal host) and a dichroic dye, or a layer comprising other additives such as a chiral dopant together with a liquid crystal compound is also a kind of liquid crystal layer defined in this specification. The liquid crystal layer may be a light modulation film layer, and thus the liquid crystal compound may exist in the liquid crystal layer such that the orientation direction changes depending on whether or not an external signal is applied. As the liquid crystal compound, any kind of liquid crystal compound can be used as far as the orientation direction can be changed by application of an external signal. For example, a smectic liquid crystal compound, a nematic liquid crystal compound or a cholesteric liquid crystal compound can be used as the liquid crystal compound. Furthermore, the liquid crystal compound may be, for example, a compound which has no polymerizable group or crosslinkable group so that the orientation direction can be changed by application of an external signal.

The liquid crystal layer may comprise a liquid crystal compound whose dielectric constant anisotropy is positive or negative. The absolute value of the dielectric constant anisotropy of the liquid crystal can be appropriately selected in consideration of the object of the present disclosure. The term dielectric constant anisotropy ($\Delta\varepsilon$) may mean a difference ($\varepsilon//-\varepsilon\perp$) between the horizontal dielectric permittivity ($\varepsilon//$) and the vertical permittivity ($\varepsilon\perp$) of the liquid crystal. In this specification, the term horizontal permittivity ($\varepsilon\perp$) means a dielectric constant value measured along the direction of an electric field in a state where a voltage is applied so that the director of the liquid crystal and the direction of the electric field by the applied voltage are substantially horizontal, and the vertical permittivity ($\varepsilon\perp$) means a dielectric constant value measured along the direction of an electric field in a state where a voltage is applied so that the director of the liquid crystal and the direction of the electric field by the applied voltage are substantially perpendicular.

The driving mode of the liquid crystal layer may be exemplified by, for example, a DS (dynamic scattering) mode, an ECB (electrically controllable birefringence) mode, an IPS (in-plane switching) mode, an FFS (fringe-field switching) mode, an OCB (optically compensated bend) mode, a VA (vertical alignment) mode, an MVA (multi-domain vertical alignment) mode, a PVA (patterned vertical alignment) mode, an HAN (hybrid aligned nematic) mode, a TN (twisted nematic) mode, an STN (super twisted nematic) mode or R-TN (reversed twisted nematic) mode, and the like.

The liquid crystal layer of the present disclosure may be designed (formed) to be capable of implementing at least twisted orientation in the above modes. The twisted orientation means a state where the liquid crystal compounds in the liquid crystal layer are oriented in a twisted form based on an imaginary spiral axis, and this twisted orientation may be implemented in a state where the liquid crystal compounds of the liquid crystal layer are horizontally oriented, vertically oriented, obliquely oriented or spray-oriented. In addition, the twisted orientation may be implemented in an initial state of the liquid crystal layer or may also be implemented in a state to which an external signal is applied. Here, the initial state means a state where an external signal capable of controlling the orientation of the liquid crystal compound is not applied to the liquid crystal layer.

In one example, the liquid crystal layer may be a light modulation layer that its initial state is a vertical orientation state, and the twisted orientation is implemented when an external signal (e.g., an electrical signal such as a voltage) is applied.

The light modulation layer, which is a liquid crystal layer, basically comprises the liquid crystal compound, which may also comprise additional components if necessary.

For example, the liquid crystal layer, which is the light modulation layer, may also comprise a so-called chiral dopant together with the liquid crystal compound. Such a chiral dopant may induce the orientation of the helical structure, that is, the twisted orientation in the liquid crystal compound.

The chiral dopant that can be included in the light modulation layer can be used without particular limitation as long as it can induce a desired rotation (twisting) without deteriorating the liquid crystallinity, for example, the nematic regularity. The chiral dopant for inducing rotation in the liquid crystal molecules needs to include at least chirality in the molecular structure. The chiral dopant may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral dopant may be, for example, a low molecular weight compound having a molecular weight of 1,500 or less. As the chiral dopant, commercially available chiral nematic liquid crystals, for example, chiral dopant liquid crystal S811 commercially available from Merck Co., Ltd. or BASF's LC756 may be applied.

There is also no particular limitation on the ratio of the chiral dopant, but it may be added so that the ratio (t/p) of the thickness (t, cell gap) of the light modulation layer to the pitch (pitch of the twisted orientation) (p) of the helical structure of the liquid crystal compound generated by the addition of the chiral dopant may satisfy a K value to be described below.

The pitch (p) of the so-called twist-oriented light modulation layer (liquid crystal layer) to which the chiral dopant is applied may be measured by a measurement method using a wedge cell, and it may be measured by a method described in Simple method for accurate measurement of the cholesteric pitch using a "stripe-wedge Grandjean-Cano cell of D. Podolskyy, et al. (Liquid Crystals, Vol. 35, No. 7, July 8\2008, 789-791). In addition, the content (weight %) of the chiral dopant is calculated by an equation of 100/(HTP (helical twisting power)×pitch (nm)), which may be selected in an appropriate ratio in consideration of the desired pitch (p).

In one example, the light modulation layer may be designed (formed) so that the K value of Equation 1 below is in a range of 0.15 to 0.4.

$$K=\Delta n \times p/t \quad \text{[Equation 1]}$$

In Equation 1, Δn is the refractive index anisotropy of the liquid crystal layer, p is the pitch in the twisted orientation, and t is the thickness of the liquid crystal layer.

The thickness of the liquid crystal layer, which is t in Equation 1 above, is a thickness known in the industry as a so-called cell gap. In Equation 1, the refractive index anisotropy has no unit and the units of the pitch (p) and the thickness (t) of the liquid crystal layer are the same, so that the unit of the K value does not exist.

The refractive index anisotropy related to Equation 1 can be measured in the manner described in Examples.

By making the K value of Equation 1 to be in the range of 0.15 to 0.4, it is possible to provide a light modulating device capable of stably maintaining the designed optical properties even after an encapsulation process in which a pressure is applied, such as an autoclave process.

The method of designing the light modulation layer so that the K value falls within the above range is not particularly limited, and for example, a method of adjusting the ratio of the chiral dopant may be applied so that the pitch (p) appears, which may represent the desired K value in consideration of the refractive index anisotropy (Δn) and thickness (t, cell gap) of the liquid crystal layer.

In another example, the K value may be 0.16 or more, 0.17 or more, 0.18 or more, 0.19 or more, 0.2 or more, or more than 0.2, or may be 0.39 or less, 0.38 or less, 0.37 or less, 0.36 or less, 0.35 or less, 0.34 or less, 0.33 or less, 0.32 or less, 0.31 or less, 0.3 or less, or less than 0.3.

The ranges of the refractive index anisotropy (Δn) of the liquid crystal layer, the pitch (p) and the thickness (t) of the liquid crystal layer in Equation 1 may be selected from ranges that may represent the K value.

For example, the refractive index anisotropy (Δn) of the liquid crystal layer may be in the range of 0.01 to 0.5. In another example, the refractive index anisotropy may be 0.02 or more, 0.03 or more, 0.04 or more, 0.05 or more, 0.06 or more, 0.07 or more, 0.08 or more, or 0.085 or more, or may be 0.45 or less, 0.4 or less, 0.35 or less, 0.3 or less, 0.25 or less, 0.2 or less, 0.15 or less, or 0.1 or less or so.

Also, the pitch (p) of the twisted orientation may be in the range of 1 to 100 μm. In another example, the pitch may be 2 μm or more, 3 μm or more, 4 μm or more, 5 μm or more, 6 μm or more, 7 μm or more, 8 μm or more, 9 μm or more, or 9.5 μm or more, or may also be 95 μm or less, 90 μm or less, 85 μm or less, 80 μm or less, 75 μm or less, 70 μm or less, 65 μm or less, 60 μm or less, 55 μm or less, 50 μm or less, 45 μm or less, 40 μm or less, 35 μm or less, 30 μm or less, or 25 μm or less or so.

In addition, the thickness (t, cell gap) of the liquid crystal layer may be in the range of 0.5 μm to 50 μm. In another example, the thickness (t, cell gap) may be 1 μm or more, 1.5 μm or more, 2 μm or more, 2.5 μm or more, 3 μm or more, or 3.5 μm or more, or may also be 48 μm or less, 46 μm or less, 44 μm or less, 42 μm or less, 30 μm or less, 38 μm or less, 36 μm or less, 34 μm or less, 32 μm or less, 30 μm or less, 28 μm or less, 26 μm or less, 24 μm or less, 22 μm or less, 20 μm or less, 18 μm or less, 16 μm or less, 14 μm or less, 12 μm or less, or 10 μm or less or so.

Furthermore, the ratio (t/p) of the thickness (t, cell gap) of the light modulation layer (liquid crystal layer) to the pitch (p) of the twisted orientation may be less than 1. In another example, the ratio (t/p) may be 0.95 or less, 0.9 or less, 0.85 or less, 0.8 or less, 0.75 or less, 0.7 or less, 0.65 or less, 0.6 or less, 0.55 or less, 0.5 or less, 0.45 or less, 0.4 or less, or 0.35 or less, or may also be 0.1 or more, 0.15 or more, 0.2 or more, 0.25 or more, 0.3 or more, 0.35 or more, or 0.4 or more or so.

Through such a design, it is possible to provide a light modulating device in which the object of the present disclosure is more efficiently achieved.

In the light modulation layer (liquid crystal layer), other necessary additional components (e.g., dichroic dye, etc.) may also be included.

There is no particular limitation on the kind of the liquid crystal alignment film that can be formed on the first surface of the first and/or second substrate. As the alignment film, a known vertical or horizontal alignment film, or other alignment films may be applied in consideration of the desired initial orientation. As for the type of alignment film, a contact alignment film such as a rubbing alignment film or a non-contact alignment film such as a photo-alignment film may be applied. In one example, a vertical alignment film may be used as the alignment film. For example, a combination of a vertical alignment film and a pressure-sensitive adhesive layer or adhesive layer to be described below may induce an orientation state of a liquid crystal compound suitable for various applications.

In the case of forming an adhesive layer or pressure-sensitive adhesive layer on the first surface of the first substrate in the light modulation film layer, the type of the adhesive layer or pressure-sensitive adhesive layer is not particularly limited. For example, various types of pressure-sensitive adhesives or adhesives known as a so-called OCA (optically clear adhesive) or OCR (optically clear resin) in the industry may induce suitable orientation of the liquid crystal compound in combination with the liquid crystal alignment film. As the pressure-sensitive adhesive or adhesive, for example, an acrylic, silicone-based, epoxy-based, or urethane-based pressure-sensitive adhesive or adhesive may be applied.

As the suitable pressure-sensitive adhesive or adhesive, a silicone-based pressure-sensitive adhesive or adhesive may be exemplified. The specific surface characteristics of the silicone-based pressure-sensitive adhesive or adhesive may induce the orientation state of the liquid crystal compound suitable for the purpose in combination with the liquid crystal alignment film (especially, vertical alignment film).

As the silicone-based pressure-sensitive adhesive or adhesive, a cured product of a curable silicone adhesive or pressure-sensitive adhesive composition (hereinafter, may be simply referred to as a curable silicone composition) may be used. The type of curable silicone composition is not particularly limited, and for example, a heat-curable silicone composition or an ultraviolet-curable silicone composition may be used.

In one example, the curable silicone composition is an addition-curable silicone composition, which may comprise (1) an organopolysiloxane containing two or more alkenyl groups in the molecule, and (2) an organopolysiloxane containing two or more silicon-bonded hydrogen atoms in the molecule. Such a silicone compound may form a cured product by an addition reaction, for example, in the presence of a catalyst such as a platinum catalyst.

The (1) organopolysiloxane comprises, as a main component constituting the silicone cured product, at least two alkenyl groups in one molecule. At this time, a specific example of the alkenyl group includes a vinyl group, an allyl group, a butenyl group, a pentenyl group, a hexenyl group or a heptenyl group, and the like, and a vinyl group of the foregoing is usually applied, but is not limited thereto. In the (1) organopolysiloxane, the bonding position of the alkenyl group as described above is not particularly limited. For example, the alkenyl group may be bonded to the end of the molecular chain and/or to the side chain of the molecular chain. In addition, in the (1) organopolysiloxane, the type of the substituent that may be included in addition to the above-described alkenyl may include an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like, and a methyl group or a phenyl group of the foregoing is usually applied, but is not limited thereto.

The molecular structure of the (1) organopolysiloxane is not particularly limited, which may also have any shape, such as linear, branched, cyclic, reticulated or linear with partially branched. One having a linear molecular structure among such molecular structures is usually applied, but is not limited thereto.

A more specific example of the (1) organopolysiloxane may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1_2SiO_{2/2}$ and a siloxane unit represented by $R^1_2R^2SiO_{1/2}$ and a siloxane unit represented by $SiO_{4/2}$, an organopolysiloxane copolymer comprising a siloxane unit represented by $R^1_2R^2SiO_{1/2}$ and a siloxane unit represented by $SiO_{4/2}$, an organopolysiloxane copolymer comprising a siloxane unit represented by $R^1R^2SiO_{2/2}$ and a siloxane unit represented by $R^1SiO_{3/2}$ or a siloxane unit represented by $R^2SiO_{3/2}$, and a mixture of two or more of the foregoing, but is not limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group, or a 3,3,3-trifluoropropyl group, and the like. In addition, here, $R^2$ is an alkenyl group, which may be, specifically, a vinyl group, an allyl group, a butenyl group, a pentenyl group, a hexenyl group or a heptenyl group, and the like.

In the addition-curable silicone composition, the (2) organopolysiloxane may serve to crosslink the (1) organopolysiloxane. In the (2) organopolysiloxane, the bonding position of the hydrogen atom is not particularly limited, which may be, for example, bonded to the end and/or side chain of the molecular chain. Also, in the (2) organopolysiloxane, the kind of substituents that may be included in addition to the silicon-bonded hydrogen atom is not particularly limited, which may include, for example, an alkyl group, an aryl group, an aralkyl group or a halogen-substituted alkyl group, and the like as mentioned in the (1) organopolysiloxane, and among these, a methyl group or a phenyl group is usually applied, but is not limited thereto.

The molecular structure of the (2) organopolysiloxane is not particularly limited, and may also have any shape, such as linear, branched, cyclic, reticulated, or linear with partially branched. One having a linear molecular structure among such molecular structures is usually applied, but is not limited thereto.

A more specific example of the (2) organopolysiloxane may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1{}_3SiO_{1/2}$, a siloxane unit represented by $R^1{}_2HSiO_{1/2}$ and a siloxane unit represented by $SiO_{4/2}$, an organopolysiloxane copolymer comprising a siloxane unit represented by $R^1{}_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

The content of the (2) organopolysiloxane is not particularly limited as long as it is included to the extent that appropriate curing can be performed. For example, the (2) organopolysiloxane may be contained in an amount of 0.5 to 10 silicon-bonded hydrogen atoms per one alkenyl group contained in the (1) organopolysiloxane as described above. In such a range, curing can be sufficiently performed and heat resistance can be secured.

The addition-curable silicone composition may further comprise platinum or a platinum compound as a catalyst for curing. The specific type of this platinum or platinum compound is not particularly limited. The ratio of the catalyst may also be adjusted to a level that proper curing may be performed.

In addition, the addition-curable silicone composition may also comprise an appropriate additive required from the viewpoint of improving storage stability, handling properties and workability in an appropriate ratio.

In another example, the silicone composition may comprise, as a condensation-curable silicone composition, for example, (a) an alkoxy group-containing siloxane polymer; and (b) a hydroxyl group-containing siloxane polymer.

The (a) siloxane polymer may be, for example, a compound represented by Formula 1 below.

$$R^1{}_aR^2{}_bSiO_c(OR^3)_d \quad \text{[Formula 1]}$$

In Formula 1, $R^1$ and $R^2$ each independently represent a hydrogen atom or a substituted or unsubstituted monovalent hydrocarbon group, $R^3$ represents an alkyl group, where when a plurality of $R^1$, $R^2$ and $R^3$ are present, they each may be the same or different from each other, and a and b each independently represent a number of 0 or more and less than 1, a+b represents a number of more than 0 and less than 2, c represents a number of more than 0 and less than 2, d represents a number of more than 0 and less than 4, and a+b+c×2+d is 4.

In the definition of Formula 1, the monovalent hydrocarbon group may be, for example, an alkyl group having 1 to 8 carbon atoms, a phenyl group, a benzyl group or a tolyl group, and the like, where the alkyl group having 1 to 8 carbon atoms may be a methyl group, an ethyl group, a propyl group, an isopropyl group, a butyl group, a pentyl group, a hexyl group, a heptyl group or an octyl group, and the like. Also, in the definition of Formula 1, the monovalent hydrocarbon group may be substituted with a known substituent such as a halogen, an amino group, a mercapto group, an isocyanate group, a glycidyl group, a glycidoxy group or a ureido group.

In the definition of Formula 1, an example of the alkyl group of $R^3$ may include a methyl group, an ethyl group, a propyl group, an isopropyl group or a butyl group, and the like. Among these alkyl groups, a methyl group or an ethyl group, and the like is usually applied, but is not limited thereto.

Among the polymers of Formula 1, a branched or tertiary crosslinked siloxane polymer may be used. Furthermore, in this (a) siloxane polymer, a hydroxyl group may remain within a range that does not impair the object, specifically within a range that does not inhibit the dealcoholization reaction.

The (a) siloxane polymer may be produced, for example, by hydrolyzing and condensing a polyfunctional alkoxysilane or a polyfunctional chlorosilane, and the like. An average technician in this field can easily select an appropriate polyfunctional alkoxysilane or chlorosilane depending on the desired (a) siloxane polymer, and can also easily control the conditions of the hydrolysis and condensation reactions using the same. Meanwhile, in the production of the (a) siloxane polymer, an appropriate monofunctional alkoxy silane may also be used in combination depending on the purpose.

As the (a) siloxane polymer, for example, a commercially available organosiloxane polymer such as Shin-Etsu Silicone's X40-9220 or X40-9225, or GE Toray Silicone's XR31-B1410, XR31-B0270 or XR31-B2733 may be used.

As the (b) hydroxyl group-containing siloxane polymer contained in the condensation-curable silicone composition, for example, a compound represented by the following formula 2 may be used.

[Formula 2]

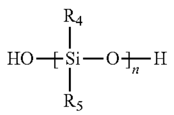

In Formula 2, $R_4$ and $R_5$ each independently represent a hydrogen atom or a substituted or unsubstituted monovalent hydrocarbon group, where when a plurality of $R_4$ and $R_5$ are present, they may be the same or different from each other, and n represents an integer of 5 to 2,000.

In the definition of Formula 2, the specific type of the monovalent hydrocarbon group may include, for example, the same hydrocarbon group as the case of Formula 1 above.

The (b) siloxane polymer may be produced, for example, by hydrolyzing and condensing dialkoxysilane and/or dichlorosilane, and the like. An average technician in this field can easily select an appropriate dialkoxysilane or dichlorosilane according to the desired (b) siloxane polymer, and can also easily control the conditions of the hydrolysis and condensation reactions using the same. As the (b) siloxane polymer as above, a commercially available bifunctional organosiloxane polymer, such as GE Toray Silicone's XC96-723, YF-3800 or YF-3804, and the like may be used.

The above-described addition-curing or condensation-curing silicone composition is an example of a material for forming the silicone pressure-sensitive adhesive or adhesive applied in the present disclosure. That is, basically, all silicone pressure-sensitive adhesives or adhesives known as OCA or OCR, and the like in the industry can be applied in the present disclosure.

The type of the pressure-sensitive adhesive or adhesive or the curable composition forming the same is not particularly limited, which may be appropriately selected according to the intended use. For example, a solid, semi-solid or liquid pressure-sensitive adhesive or adhesive or curable composition may be used. The solid or semi-solid pressure-sensitive adhesive or adhesive or curable composition may be cured before the adhesion object is bonded. The liquid pressure-sensitive adhesive or adhesive or curable composition is referred to as a so-called optical clear resin (OCR), which may be cured after the adhesion object is bonded. According to one example, as the pressure-sensitive adhesive or adhesive or curable composition, a so-called polydimethyl siloxane-based pressure-sensitive adhesive or adhesive or curable composition or polymethylvinyl siloxane-based pressure-sensitive adhesive or adhesive or curable composition or alkoxysilicone-based pressure-sensitive adhesive or adhesive or curable composition may be used, without being limited thereto.

The thickness of the pressure-sensitive adhesive layer or adhesive layer is not particularly limited, which may be selected in an appropriate range for securing a desired adhesion or cohesion. The thickness may be in the range of approximately 1 μm to 50 μm. In another example, the thickness may be 2 μm or more, 3 μm or more, 4 μm or more, 5 μm or more, 6 μm or more, 7 μm or more, 8 μm or more, 9 μm or more, or 10 μm or more, or may also be 45 μm or less, 40 μm or less, 35 μm or less, 30 μm or less, 25 μm or less, 20 μm or less, 15 μm or less, or 10 μm or less or so.

When such a pressure-sensitive adhesive layer or adhesive layer is formed on the first surface of the first substrate, the liquid crystal alignment film may not be formed on the first substrate.

The initial orientation of the liquid crystal compound formed by the liquid crystal alignment films and/or the pressure-sensitive adhesive layer or adhesive layer and the liquid crystal alignment film in the liquid crystal layer, which is a light modulation layer, may be vertical orientation, horizontal orientation, oblique orientation or spray orientation. Also, in the vertical orientation, horizontal orientation, oblique orientation or spray orientation state, the liquid crystal compound may or may not be twisted to exist in twisted orientation or cholesteric orientation. The initial orientation means orientation in a state where an external signal is not applied to the light modulation layer comprising the liquid crystal compound.

The meaning of the horizontal orientation, oblique orientation, vertical orientation or spray orientation is as known in the art. While the liquid crystal compound of the light modulation layer maintains the horizontal orientation, oblique orientation, vertical orientation or spray orientation state in the initial state, it can be changed to the other orientation states according to an external signal.

In one example, the initial orientation of the liquid crystal compound in the light modulation layer may be vertical orientation or an orientation state similar to the vertical orientation, and the twisted orientation may be implemented when an external signal is applied. Such an orientation state is obtained by applying a vertical alignment film as the liquid crystal alignment film. This orientation is useful in an element implementing so-called R-TN (reversed twisted nematic) orientation.

The in-plane phase difference (based on a wavelength of 550 nm) of the light modulation layer in the vertical orientation or an orientation state similar to the vertical orientation may be, for example, about 30 nm or less, 25 nm or less, 20 nm or less, 15 nm or less, 10 nm or less, or 5 nm or less, or may be 0 nm or more, or more than 0 nm.

The in-plane phase difference is obtained according to Equation 2 above, and in this case, nx, ny and d in Equation 2 are the slow axis direction refractive index, the fast axis direction refractive index and the thickness of the light modulation layer, respectively.

The light modulation film layer may further comprise a spacer for maintaining a distance between the first and second substrates. As the spacer, a ball spacer, a column spacer or a partition wall spacer, or a combination of two or more of the foregoing, which is a commonly applied spacer, may be applied. In a suitable example, the partition wall spacer may be used as the spacer, and in particular, the partition wall spacer in which the partition walls form at least one closed figure may be applied. As the closed figure formed by the partition wall spacer, a hexagon (e.g., a regular hexagon, etc.) or a quadrangle (e.g., a square or a rectangle) may be exemplified. The partition wall spacer whose closed figure is a hexagon, particularly a regular hexagon, is also called a so-called honeycomb type spacer. When the shape of the partition spacer formed on the substrate is observed from the normal direction of the substrate, such a honeycomb or quadrangular partition spacer means the case where the figure formed by the partition spacer is a honeycomb type or a quadrangle type, as is well-known. The honeycomb type is usually a combination of regular hexagons, and in the case of the quadrangle type, there may be a square, a rectangle, or a combination of a square and a rectangle, and the like. A partition wall spacer may be used as the spacer in consideration of the adhesion between the first and second substrates, but is not limited thereto.

The pitch of the spacer may also be appropriately selected in consideration of the desired adhesion or cell gap maintaining efficiency, and the like. For example, when the partition spacer is applied, the pitch of the partition spacer may be in a range of 50 μm to 2,000 μm. For example, if the partition spacer is a honeycomb type, the pitch is obtained through the interval of opposite sides in the hexagon forming the honeycomb, and in the case of a tetragon, the pitch is obtained through the length of the sides of the tetragon. In the case where the intervals of the sides facing each other in the hexagon forming the honeycomb or the lengths of the sides of the tetragon are not constant, an average value of them may be defined as the pitch.

When the partition wall spacer constitutes a closed figure, for example, the area of the closed figure (i.e., the area of, for example, the hexagon or the quadrangle) may be, for example, in a range of about 1 to 200 $mm^2$. When a plurality of closed figures are formed by the partition wall spacers and the closed figures have different areas, the area is an arithmetic mean value.

The line width of the partition spacer, for example, the width of each wall of the hexagon forming the honeycomb, or the tetragon, may be in a range of, for example, about 5 μm to 50 μm. In another example, the line width may be about 10 μm or more, or 15 μm or more, or may also be 45 μm or less, 40 μm or less, 35 μm or less, 30 μm or less, 25 μm or less, or 20 μm or less or so.

In such a range, the cell gap may be properly maintained, and adhesion between substrates may also be maintained excellently. For example, when the pressure-sensitive adhesive layer or the adhesive layer is formed on the first substrate, the combination with the partition wall spacer can provide excellent adhesive force between the substrates.

As a component for applying an external signal to the light modulation layer, an electrode layer may be formed on each substrate of the light modulation film layer. For example, the electrode layer may be present between the first surface and the functional layer (the liquid crystal alignment film, the pressure-sensitive adhesive or adhesive layer) in the first substrate (between 100 and 1001 in FIG. 1) and/or between the first surface and the liquid crystal alignment film in the second substrate (between 200 and 2001 in FIG. 1) (if a spacer is present, between the spacer and the alignment film). In the case of the second substrate, it is common that first, an electrode layer is formed on the first surface, and a spacer and an alignment film are formed thereon sequentially, so that when a spacer is present, the electrode layer may be located between the first surface of the second substrate and the spacer and alignment film.

As the electrode layer, a known transparent electrode layer may be applied, and for example, a so-called conductive polymer layer, a conductive metal layer, a conductive nanowire layer, or a metal oxide layer such as ITO (indium tin oxide) may be used as the electrode layer. Besides, various materials and forming methods capable of forming a transparent electrode layer are known, which can be applied without limitation.

The light modulating device may comprise other additional constitutions as necessary, while basically comprising the light modulation film layer. That is, depending on the driving mode, the implementation of the above-described transparent, black, high reflection and/or low reflection mode and switching between them are possible even with the light modulation film layer alone, but in order to facilitate the implementation or switching of these modes, it is also possible to include additional components.

For example, the device may further comprise a polarization layer (passive polarization layer) disposed on one side or both sides of the light modulation film layer. In one example, the device further comprises a polarization layer disposed on the second surface of the first or second substrate. FIG. 2 is, as an example of the above structure, the case where in the structure of FIG. 1, the polarization layer (400) is disposed only on one side of the light modulation film layer, and FIG. 3 is the case where in the structure of FIG. 1, the polarization layer (400) is disposed on both sides of the light modulation film layer. In addition, when the partition spacer is applied as the spacer and the shape is a tetragon (square or rectangle), the sides of the tetragon and the absorption axis of the polarization layer are suitably disposed to be substantially vertical or horizontal to each other. In one example, a small angle between the slow axis of the first or the second substrate and the absorption axis of the polarization layer may be in a range of 80 degrees to 100 degrees.

The term polarization layer may mean an element that converts natural light or unpolarized light into polarized light. In one example, the polarization layer may be a linear polarization layer. The linear polarization layer means a case where the selectively transmitting light is linearly polarized light that vibrates in any one direction and the selectively absorbing or reflecting light is linearly polarized light that vibrates in directions orthogonal to the vibration direction of the linearly polarized light. That is, the linear polarization layer may have a transmission axis and absorption axes or reflection axes orthogonal to each other in the plane direction.

The polarization layer may be an absorptive polarization layer or a reflective polarization layer. As the absorptive polarization layer, for example, a polarization layer in which iodine is dyed to a polymer stretched film such as a PVA stretched film, or a guest-host polarization layer in which liquid crystals polymerized in an oriented state are used as a host and dichroic dyes arranged along the orientation of the liquid crystals are used as a guest may be used, without being limited thereto.

As the reflective polarization layer, for example, a reflective polarization layer known as a so-called DBEF (dual brightness enhancement film) or a reflective polarization layer formed by coating a liquid crystal compound such as LLC (lyotropic liquid crystal) may be used, but is not limited thereto.

As shown in FIG. 3, it may have a structure in which the polarization layers are disposed on both sides of the light modulation film layer. In this case, the angle formed by the transmission axes of the polarization layers disposed on both sides may be in the range of 85 degrees to 95 degrees, or approximately perpendicular.

In one example, the optical device may also be configured without comprising any polarization layer. For example, an optical device may also be configured without applying any polarization layer after blending a dichroic dye as an additional component in the liquid crystal layer.

The light modulating device may comprise other necessary constitutions in addition to the above constitutions.

For example, the light modulating device may further comprise an optically anisotropic film satisfying the refractive index relationship of Equation 3 below. Such a film may further improve the performance of the device by optically compensating for the substrate or the light modulation layer.

$$nz<ny \qquad \text{[Equation 3]}$$

In Equation 3, ny is the refractive index of the optically anisotropic film for a wavelength of 550 nm in the fast axis direction, and nz is the refractive index of the optically anisotropic film for a wavelength of 550 nm in the thickness direction.

The optically anisotropic film satisfying the relationship of Equation 3 above is a film exhibiting the properties of a so-called negative C plate.

The thickness direction phase difference of the optically anisotropic film may be, for example, in a range of −700 nm to −10 nm. The optically anisotropic film may also exist in one layer or two or more layers in the optical device, and when the optically anisotropic film exists in one layer, the thickness direction phase difference is the thickness direction phase difference of the one layered-film, and when it exists in a plurality of two or more layers, it is the sum of thickness direction phase differences of all films.

In addition, the thickness direction phase difference is a physical quantity determined by Equation 4 below.

$$Rth=d\times(nz-ny) \quad \text{[Equation 4]}$$

In Equation 4, Rth is the thickness direction phase difference, nz is the thickness direction refractive index of the film, ny is the fast axis direction refractive index of the film, and d is the thickness of the film. Here, the meanings of the thickness direction and the fast axis are known in the industry.

As the optically anisotropic film, a film satisfying Equation 3 above, which is a known retardation film, may be applied, and as this type of film, for example, stretched polymer films or liquid crystal films, and the like are variously known in the industry.

The optically anisotropic film may be present on the first and/or second substrate, which may be formed, for example, on the first surface of the first and/or second substrate. At this time, the optically anisotropic film may be present between the first and/or second substrate and the light modulation layer; when the liquid crystal alignment film, or the pressure-sensitive adhesive layer or adhesive layer (liquid crystal alignment film, etc.) is formed on the first surface, it may be formed between the first and/or second substrate and the liquid crystal alignment film, etc.; and when an electrode layer is formed on the first surface, it may also be formed between the first and/or second substrate and the electrode layer.

The light modulating device may comprise other constitutions, if necessary, in addition to the above constitutions. For example, any other constitution necessary for driving or using the light modulating device, such as a pressure-sensitive adhesive layer or adhesive layer for attaching other components in addition to the pressure-sensitive adhesive layer or adhesive layer formed on the first surface of the first substrate, a hard coating film, an antireflection film and/or an NIR (near-infrared) cut layer, may be added.

A method for manufacturing the light modulating device is not particularly limited, and the device may be manufactured through a known method except that the above elements are applied as each component.

The present disclosure also relates to an optical device. The optical device may have a structure in which the light modulating device is encapsulated with an encapsulating agent.

Such an optical device may comprise: first and second outer substrates disposed opposite to each other; and the light modulating device encapsulated with an encapsulating agent between the first and second outer substrates. The first and second outer substrates are separate substrates which are distinct from the substrates included in the light modulation film layer, and thus, they are referred to as outer substrates. Therefore, the optical device may comprise at least four substrates of the first and second substrates included in the light modulation film layer and the first and second outer substrates.

The first and second expressions in the names of the substrates are convenient expressions for distinguishing the substrates, and these expressions do not prescribe the front and rear or upper and lower relationship of the substrates or the outer substrates. The light modulating device may be encapsulated between the two sheets of outer substrates. Such encapsulation may be accomplished using an encapsulating agent, where the encapsulating agent may be an adhesive film.

As the outer substrate, for example, an inorganic substrate made of glass or the like, or a plastic substrate can be used. As the plastic substrate, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethylene terephthalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the outer substrate, if necessary.

The thickness of the outer substrate is not particularly limited, and may be, for example, about 0.3 mm or more. In another example, the thickness may be about 0.5 mm or more, about 1 mm or more, about 1.5 mm or more, or about 2 mm or more or so, and may also be 10 mm or less, 9 mm or less, 8 mm or less, 7 mm or less, 6 mm or less, 5 mm or less, 4 mm or less, or 3 mm or less or so.

The outer substrate may be a flat substrate or may be a substrate having a curved surface shape. For example, the two outer substrates may be simultaneously flat substrates, simultaneously have a curved surface shape, or any one may be a flat substrate and the other may be a substrate having a curved surface shape.

Here, in the case of having the curved surface shape at the same time, the respective curvatures or curvature radii may be the same or different.

The optical device may further comprise an encapsulating agent, e.g., an adhesive film, for encapsulating the light modulating device within the outer substrate. Such an adhesive film, for example, may be present at least between the outer substrate and the light modulating device. For example, when the light modulating device comprises both the light modulation film layer and the polarization layer, the encapsulating agent (adhesive film) may be present in at least one of positions between the outer substrate and the light modulation film layer, between the light modulation film layer and the polarization layer and between the polarization layer and the outer substrate. In addition, the encapsulating agent may be present on the sides (suitably all sides) of the light modulating device, for example the sides (suitably all sides) of the light modulation film layer and the polarization layer.

The adhesive film, which is an encapsulating agent, may encapsulate the light modulating device while bonding the outer substrate and at least one constitution of the light modulating device to each other.

For example, the structure may be implemented through an autoclave process or the like in which an outer substrate, a light modulating device and an encapsulating agent (adhesive film) are laminated and then pressed according to the desired structure. In the present disclosure, even after such a pressurizing process is performed, the performance of the light modulating device can be efficiently maintained as designed.

As the encapsulating agent (adhesive film), a known material may be used without particular limitation, and for example, an appropriate film may be selected from known thermoplastic polyurethane (TPU) adhesive films, TPS (thermoplastic starch), polyamide adhesive films, polyester adhesive films, EVA (ethylene vinyl acetate) adhesive films, polyolefin adhesive films, such as polyethylene or polypropylene, or polyolefin elastomer films (POE films), and the like.

The thickness of the encapsulating agent (adhesive film, etc.) is not particularly limited, and may be, for example, in a range of about 200 μm to 600 μm or so. Here, the thickness of the adhesive film may be a thickness of the adhesive film between the outer substrate and the light modulating device, for example, a distance between both, or the like.

The optical device may further comprise necessary constitutions in addition to the above constitutions as appropriate, and an example of such constitutions includes a buffer layer, a retardation layer, an optical compensation layer, an antireflection layer and/or a hard coating layer, and the like, but is not limited thereto.

The optical device may comprise a step of encapsulating the light modulating device between the first and second outer substrates disposed opposite to each other through a pressurizing process using the encapsulating agent.

At this time, the specific kind of the pressurizing process is not particularly limited. For example, the pressurizing process may be an autoclave process.

Therefore, the method for manufacturing the optical device may comprise a step of encapsulating the light modulating device between the first and second outer substrates disposed opposite to each other through an autoclave process using an adhesive film.

The autoclave process may be performed by disposing an adhesive film and a light modulating device between the outer substrates according to the desired encapsulation structure, and heating/pressing.

For example, a laminate, in which an outer substrate, an adhesive film, a light modulating device, an adhesive film and an outer substrate are disposed in this order and an adhesive film is also disposed on the sides of the light modulating device, may be subjected to heating/pressurizing by an autoclave process to form an optical device.

The conditions of the autoclave process are not particularly limited, and for example, the process may be performed under an appropriate temperature and pressure according to the type of the applied encapsulating agent (adhesive film). The temperature of a typical autoclave process is about 40° C. or more, 50° C. or more, 60° C. or more, 70° C. or more, 80° C. or more, 90° C. or more, or 100° C. or more, and the pressure is 2 atm or more, without being limited thereto. The upper limit of the process temperature may be about 200° C. or less, 190° C. or less, 180° C. or less, or 170° C. or less or so, and the upper limit of the process pressure may be about 10 atm or less, 9 atm or less, 8 atm or less, 7 atm or less, or 6 atm or less or so.

Such an optical device can be used for various applications, and can be used, for example, in eyewear such as sunglasses or eyewear for AR (augmented reality) or VR (virtual reality), exterior walls of buildings or sunroofs for vehicles, and the like.

Effects of Invention

The present disclosure can provide a light modulating device that can stably maintain designed optical properties even after an encapsulation process in which a pressure is applied, such as an autoclave process, an optical device or a manufacturing method thereof. The present disclosure can also provide a light modulating device, which can also stably maintain the orientation state of a light modulation layer while effectively securing adhesive force between upper and lower substrates, an optical device comprising the same or a manufacturing method thereof.

MODE FOR INVENTION

Hereinafter, the present disclosure will be described in detail through Examples, but the scope of the present disclosure is not limited by Examples below.

1. Phase Difference Evaluation

The in-plane retardation value (Rin) of the film was measured for light having a wavelength of 550 nm using a UV/VIS spectroscope 8453 instrument from Agilent Co., Ltd. Two sheets of polarizers were installed in the UV/VIS spectroscope so that their transmission axes were orthogonal to each other, and a polymer film was installed between the two sheets of polarizers so that its slow axis formed 45 degrees with the transmission axes of the two polarizers, respectively, and then the transmittance according to wavelengths was measured. The phase retardation order of each peak is obtained from the transmittance graph according to wavelengths. Specifically, a waveform in the transmittance graph according to wavelengths satisfies Equation A below, and the maximum peak (Tmax) condition in the sine waveform satisfies Equation B below. In the case of λmax in Equation A, since the T of Equation A and the T of Equation B are the same, the equations are expanded. As the equations are also expanded for n+1, n+2 and n+3, arranged for n and n+1 equations to eliminate R, and arranged for n into λn and λn+1 equations, the following Equation C is derived. Since n and λ can be known based on the fact that T of Equation A and T of Equation B are the same, R for each of λn, λn+1, λn+2 and λn+3 is obtained. A linear trend line of R values according to wavelengths for 4 points is obtained and the R value for the equation 550 nm is calculated. The function of the linear trend line is Y=ax+b, where a and b are constants. The Y value when 550 nm has been substituted for x of the function is the Rin value for light having a wavelength of 550 nm.

$$T=\sin^2[(2\pi R/\lambda)] \quad \text{[Equation A]}$$

$$T=\sin^2[((2n+1)\pi/2)] \quad \text{[Equation B]}$$

$$n=(\lambda n-3\lambda n+1)/(2\lambda n+1+1-2\lambda n) \quad \text{[Equation C]}$$

In the above, R denotes in-plane retardation (Rin), λ denotes a wavelength, and n denotes a nodal degree of a sine waveform.

2. Thickness Evaluation of Light Modulation Layer (Liquid Crystal Layer)

Since the thickness, that is, the cell gap, of the light modulation layer coincides with the height of the spacer, the height of the spacer was measured, which was defined as the cell gap. The height of the spacer was confirmed using a measuring device (Optical Profiler, manufactured by Nano system, Nano View-E1000).

3. Refractive Index Anisotropy Evaluation of Light Modulation Layer (Liquid Crystal Layer)

The refractive index anisotropy (Δn) is evaluated in the following manner using an Abbe refractometer. By coating a vertical alignment film on the measuring prism and illumination prism surfaces of the Abbe refractometer and coating a liquid crystal compound to be measured on the measuring prism and then covering it with the illumination prism, the liquid crystal compound is vertically oriented by the vertical orientation force of the two interfaces. The liquid crystal compound applied in the above process is only the liquid crystal compound, which is applied to the transmittance-variable layer, without mixing with other materials such as dichroic dye. Then, as shown in FIG. 4, when a linear polarizer is applied to the eyepiece side and irradiated with light to be observed, Θe and Θo as shown in FIG. 4 can be obtained and the extraordinary refractive index (ne=np sin Θe) and the ordinary refractive index (no=np sin Θo) can be obtained through the refractive index (np) of the measuring prism and the angles (Θe and Θo), where the difference (ne-no) may be defined as the refractive index anisotropy. The reference wavelength upon measurement is approximately 550 nm.

4. Pitch Evaluation of Light Modulation Layer (Liquid Crystal Layer)

The pitch (p) in the twisted orientation was measured by a measurement method using a wedge cell, and specifically, it was measured by the method described in Simple method for accurate measurements of the cholesteric pitch using a stripe-wedge Grandjean-Cano cell (Liquid Crystals, Vol 35, No. 7, July 8\2008, 789-791) by D. Podolskyy et al.

Example 1

Manufacture of Light Modulating Device

As the first substrate of the light modulating device, a PET (poly(ethylene terephthalate)) film (manufactured by Toyobo, SRF product) having a thickness of about 80 μm or so was used. The in-plane phase difference (550 nm) of the PET film was approximately 9,000 nm. An optically anisotropic film (negative C film satisfying Equation 3), an ITO (indium tin oxide) layer and a silicone pressure-sensitive adhesive layer were sequentially formed on the surface of the PET film (laminated structure of first substrate/optically anisotropic film/ITO layer/pressure-sensitive adhesive layer). The optically anisotropic film was formed by coating a polyamide coating liquid (a coating liquid in which polyamide obtained by polymerizing terephthalic acid, isophthalic acid and 2,2'-bis(trifluoromethyl)-4,4'-biphenyl diamine was diluted in a dimethylacetamide solution to a concentration of 5.3 weight %) on the substrate and then drying it, where the thickness direction phase difference was approximately −220 or so. The ITO layer was formed by a known deposition method, and the pressure-sensitive adhesive was formed to a thickness of 10 μm or so by bar-coating a silicone pressure-sensitive adhesive composition (Shinetsu, KR3700) thereon and drying it at about 150° C. or so for 5 minutes.

As the second substrate, a PET (poly(ethylene terephthalate)) film (manufactured by SKC, highly stretched PET product) having a thickness of 145 μm or so, in which an ITO (indium tin oxide) layer was deposited on the first surface, was used. The in-plane phase difference (550 nm) of the PET film was approximately 10,000 nm or so. As a honeycomb-type partition wall spacer, a partition wall spacer, in which the pitch of regular hexagon (closed figure) constituting the honeycomb was about 350 μm or so and the line width was about 10 μm or so, was formed on the ITO layer of the PET film. The height of the spacer was formed to satisfy the thickness (cell gap) of the liquid crystal layer (light modulation layer) summarized in Table 1 below. A vertical alignment film (5661LB3, Nissan) was formed on the spacer to a thickness of about 300 nm or so. The vertical alignment film was formed by rubbing it in one direction. The rubbing direction was perpendicular to the slow axis direction of the second substrate.

Subsequently, a liquid crystal composition was coated on the surface of the vertical alignment film of the second substrate, and the pressure-sensitive adhesive layer of the first substrate was laminated to face the coated surface of the liquid crystal composition, thereby preparing a light modulation film layer. At this time, the positions of the slow axes of the first and second substrates were adjusted such that the axes were parallel to each other.

Here, as the liquid crystal composition, a composition comprising a liquid crystal compound (Merck, MAT-19-753) and a chiral dopant (Merck, 5811) was used. The content of the chiral dopant was adjusted so that the pitch (chiral pitch) (p) of the twisted orientation might satisfy Table 1 below.

Manufacture of Optical Device

The manufactured light modulation film layer was encapsulated using an adhesive film (encapsulating agent) between two outer substrates together with a PVA (poly (vinyl alcohol)) polarization layer. Upon the encapsulation, the PVA polarization layer was made to be present on each of the second surfaces of the first and second substrates of the light modulation film layer, where the absorption axis of the PVA polarization layer present on the second surface of the second substrate was made to be perpendicular to the slow axis of the second substrate, and the absorption axis of the PVA polarization layer on the second surface of the first substrate was made to be horizontal to the slow axis of the first substrate. A thermoplastic polyurethane adhesive film (thickness: about 0.38 mm, manufacturer: Argotec, product name: ArgoFlex) was applied as the adhesive film, and a glass substrate having a thickness of about 3 mm was used as the outer substrate. The first outer substrate, the adhesive film, the PVA polarization layer, the adhesive film, the light modulation film layer, the adhesive film, the PVA polarization layer, the adhesive film and the second outer substrate were laminated in this order and the adhesive film was also disposed on all sides of the light modulation film layer to prepare a laminate. Thereafter, an autoclave process was performed at a temperature of about 100° C. and a pressure of about 2 atm or so to manufacture an optical device.

Examples 2 to 9

Light modulating devices and optical devices were manufactured in the same manner as in Example 1, except that upon manufacturing the light modulating device, the thickness (cell gap, t) of the liquid crystal layer (light modulation layer) and the pitch of the twisted orientation were adjusted as shown in Table 1 below.

TABLE 1

| | Example | | | | | | | | |
|---|---|---|---|---|---|---|---|---|---|
| | 1 | 2 | 3 | 4 | 5 | 6 | 7 | 8 | 9 |
| Liquid crystal layer refractive index anisotropy (Δn) | | | | | 0.09 | | | | |

TABLE 1-continued

| | Example | | | | | | | | |
|---|---|---|---|---|---|---|---|---|---|
| | 1 | 2 | 3 | 4 | 5 | 6 | 7 | 8 | 9 |
| Liquid crystal layer thickness (t, μm) | 4 | 4 | 6 | 6 | 6 | 8 | 8 | 8 | 8 |
| Pitch (p, μm) | 10 | 12.5 | 20 | 15 | 17.5 | 22.5 | 17.5 | 20 | 25 |
| K (= Δnxp/t) | 0.225 | 0.281 | 0.3 | 0.225 | 0.263 | 0.253 | 0.197 | 0.225 | 0.281 |

Comparative Examples 1 to 7

Light modulating devices and optical devices were manufactured in the same manner as in Example 1, except that upon manufacturing the light modulating device, the thickness (cell gap, t) of the liquid crystal layer (light modulation layer) and the pitch of the twisted orientation were adjusted as shown in Table 2 below.

TABLE 2

| | Comparative Example | | | | | | |
|---|---|---|---|---|---|---|---|
| | 1 | 2 | 3 | 4 | 5 | 6 | 7 |
| Liquid crystal 1 layer refractive index anisotropy (An) | | | | 0.09 | | | |
| Liquid crystal layer thickness (t, μm) | 4 | 4 | 6 | 8 | 8 | 6 | 8 |
| Pitch (p, μm) | 20 | 30 | 30 | 12.5 | 7.5 | 7.5 | 10 |
| K (= Δnxp/t) | 0.45 | 0.675 | 0.45 | 0.141 | 0.08 | 0.113 | 0.113 |

Transmittance was evaluated in a state where a voltage of about 60V was applied to the light modulating device and the optical device of each of Examples and Comparative Examples above, and summarized in Tables 3 and 4 below. That is, the transmittance of the light modulating device is the transmittance before the pressurizing process (autoclave) is performed, and the transmittance of the optical device is the transmittance after the pressurizing process (autoclave) is performed. The change rates of transmittance before and after the pressurizing process were also summarized in Tables 3 and 4 below. The transmittance was evaluated using a Hazemeter (NDH-5000SP).

TABLE 3

| | Example | | | | | | | | |
|---|---|---|---|---|---|---|---|---|---|
| | 1 | 2 | 3 | 4 | 5 | 6 | 7 | 8 | 9 |
| Transmittance (light modulation, before pressurization) (%) | 20.2 | 21.7 | 28.2 | 26.5 | 28.8 | 31.2 | 28.9 | 31 | 31.7 |
| Transmittance (optical, after pressurization) (%) | 20.1 | 20.9 | 27.5 | 27.2 | 28 | 31 | 28.7 | 30.7 | 30.6 |
| Change rate (%) | 0.5 | 3.7 | 2.5 | 2.6 | 2.8 | 0.6 | 0.7 | 1.0 | 3.5 |

TABLE 4

| | Comparative Example | | | | | | |
|---|---|---|---|---|---|---|---|
| | 1 | 2 | 3 | 4 | 5 | 6 | 7 |
| Transmittance (light modulation, before pressurization) (%) | 16.1 | 10.5 | 24.6 | 18.9 | — | — | — |
| Transmittance (optical, after pressurization) (%) | 15.3 | 11.1 | 22.5 | 22.4 | — | — | — |
| Change rate (%) | 5.0 | 5.7 | 8.5 | 18.5 | — | — | — |

As summarized in Tables 3 and 4, in the devices of Examples, the transmittance was stably maintained even after the pressurizing process (autoclave process), while the light modulating devices showed the appropriate transmittance.

On the other hand, in the case of Comparative Examples, the change in transmittance before and after the pressurizing process was large, or the transmittance itself did not reach the intended value. In addition, in the case of Comparative Examples 5 to 7, the orientation of the liquid crystal compound itself was not made well, so that it was impossible to measure the transmittance.

The invention claimed is:

1. An optical device, comprising:

a first outer substrate;

a second outer substrate; and a light modulating device encapsulated with an encapsulating agent between the first and second outer substrates, wherein the light modulating device comprises:
a light modulation film layer,
wherein the light modulation film layer comprises:
a first substrate;
a second substrate; and
a liquid crystal layer,
wherein each of the first and second substrates has a first surface and a second surface,
wherein the first surfaces of the first and second substrates face each other,
wherein the liquid crystal layer is disposed between the first and second substrates,
wherein the liquid crystal layer is capable of implementing twisted orientation,
wherein the light modulating device further comprises:
a pressure-sensitive adhesive layer or an adhesive layer formed on the first surface of the first substrate; and
a liquid crystal alignment film formed on the first surface of the second substrate,
wherein no liquid crystal alignment film is formed on the first substrate,
wherein the pressure-sensitive adhesive layer or the adhesive layer is a silicone pressure-sensitive adhesive layer or a silicone adhesive layer, and the liquid crystal alignment film is a vertical alignment film,
wherein an initial orientation of liquid crystal compounds in the liquid crystal layer is formed by the pressure-sensitive adhesive layer or adhesive layer formed on the first surface of the first substrate and the liquid crystal alignment film formed on the first surface of the second substrate, and
wherein a K value of Equation 1 below is in a range of 0.19 to 0.4:

$$K=\Delta n \times p/t \quad \text{[Equation 1]}$$

wherein, Δn is a refractive index anisotropy of the liquid crystal layer, p is a pitch in the twisted orientation, and t is a thickness of the liquid crystal layer.

2. The optical device according to claim 1, wherein Δn is in a range of 0.01 to 0.5.

3. The optical device according to claim 1, wherein p is in a range of 1 μm to 100 μm.

4. The optical device according to claim 1, wherein t is in a range of 0.5 μm to 50 μm.

5. The optical device according to claim 1, wherein a ratio of t to p is less than 1.

6. The optical device according to claim 1, wherein the liquid crystal layer, upon formation, is in an initial state that is a vertical orientation state, and wherein the liquid crystal layer is capable of implementing twisted orientation when a voltage is applied.

7. The optical device according to claim 1, wherein the liquid crystal layer comprises a liquid crystal compound and a chiral dopant.

8. The optical device according to claim 1, wherein the first or second substrate has an in-plane phase difference of 500 nm or more for light with a wavelength of 550 nm.

9. The optical device according to claim 1, wherein the device further comprises a polarization layer disposed on the second surface of the first or second substrate.

10. The optical device according to claim 1, wherein the device further comprises a polarization layer disposed on the second surface of the first or second substrate, wherein the first or second substrate has an in-plane phase difference of 500 nm or more for light with a wavelength of 550 nm, and wherein a small angle between the slow axis of the first or the second substrate and the absorption axis of the polarization layer is in a range of 80 degrees to 100 degrees.

11. The optical device according to claim 1, wherein the device further comprises an optically anisotropic film disposed between the first or second substrate and the liquid crystal layer and satisfying the following Equation 3:

$$nz<ny \quad \text{[Equation 3]}$$

wherein, ny is the refractive index of the optically anisotropic film for a wavelength of 550 nm in the fast axis direction, and nz is the refractive index of the optically anisotropic film for a wavelength of 550 nm in the thickness direction.

12. A window comprising the optical device of claim 1.

13. A sunroof comprising the optical device of claim 1.

14. A method for manufacturing an optical device, comprising:
encapsulating a device between a first outer substrate and a second outer substrate through a pressurizing process using an encapsulating agent,
wherein the device comprises:
a light modulation film layer,
wherein the light modulation film layer comprises:
a first substrate;
a second substrate; and
a liquid crystal layer,
wherein each of the first and second substrates has a first surface and a second surface,
wherein the first surfaces of the first and second substrates face each other,
wherein the liquid crystal layer is disposed between the first and second substrates,
wherein the liquid crystal layer is capable of implementing twisted orientation,
wherein the device further comprises:
a pressure-sensitive adhesive layer or an adhesive layer formed on the first surface of the first substrate; and
a liquid crystal alignment film formed on the first surface of the second substrate,
wherein no liquid crystal alignment film is formed on the first substrate,
wherein the pressure-sensitive adhesive layer or the adhesive layer is a silicone pressure-sensitive adhesive layer or a silicone adhesive layer, and the liquid crystal alignment film is a vertical alignment film,
wherein an initial orientation of liquid crystal compounds in the liquid crystal layer is formed by the pressure-sensitive adhesive layer or adhesive layer formed on the first surface of the first substrate and the liquid crystal alignment film formed on the first surface of the second substrate, and
wherein a K value of Equation 1 below is in a range of 0.19 to 0.4:

$$K=\Delta n \times p/t \quad \text{[Equation 1]}$$

wherein, Δn is a refractive index anisotropy of the liquid crystal layer, p is a pitch in the twisted orientation, and t is a thickness of the liquid crystal layer.

* * * * *